United States Patent
Rule et al.

(10) Patent No.: US 10,017,684 B2
(45) Date of Patent: *Jul. 10, 2018

(54) METHOD AND COMPOSITIONS FOR HYDRAULIC FRACTURING AND FOR TRACING FORMATION WATER

(71) Applicant: Spectrum Tracer Services, LLC, Tulsa, OK (US)

(72) Inventors: Jeffrey David Rule, Claremore, OK (US); Steve Allen Faurot, Skiatook, OK (US)

(73) Assignee: Spectrum Tracer Services, LLC, Tulsa, OK (US)

( * ) Notice: Subject to any disclaimer, the term of this patent is extended or adjusted under 35 U.S.C. 154(b) by 64 days.

This patent is subject to a terminal disclaimer.

(21) Appl. No.: 15/133,465

(22) Filed: Apr. 20, 2016

(65) Prior Publication Data
US 2017/0306217 A1    Oct. 26, 2017

(51) Int. Cl.
| | |
|---|---|
| G01N 33/24 | (2006.01) |
| C09K 8/62 | (2006.01) |
| E21B 43/26 | (2006.01) |
| E21B 47/10 | (2012.01) |
| E21B 43/267 | (2006.01) |

(52) U.S. Cl.
CPC .......... *C09K 8/62* (2013.01); *E21B 43/26* (2013.01); *E21B 43/267* (2013.01); *E21B 47/1015* (2013.01)

(58) Field of Classification Search
CPC .................................................... G01N 33/24
USPC .......................... 436/25, 27–29, 56, 128–129
See application file for complete search history.

(56) References Cited

U.S. PATENT DOCUMENTS

| | | | |
|---|---|---|---|
| 3,342,263 A | 9/1967 | Fischer | |
| 3,891,413 A * | 6/1975 | Sievers | G21F 9/12 210/656 |
| 3,902,362 A | 9/1975 | Tomisch et al. | |
| 3,936,458 A * | 2/1976 | Sturm | C07D 215/08 504/247 |
| 3,993,131 A | 11/1976 | Riedel | |
| 4,090,398 A | 5/1978 | Deans et al. | |
| 4,168,746 A | 9/1979 | Sheely | |
| 4,211,662 A | 7/1980 | King | |
| 4,223,725 A | 9/1980 | Teasdale et al. | |
| 4,231,426 A | 11/1980 | Carter et al. | |
| 4,303,411 A | 12/1981 | Chen et al. | |
| 4,420,565 A | 12/1983 | Schmitt | |
| 4,439,344 A | 3/1984 | Albanese | |
| 4,520,109 A | 5/1985 | Simmonds et al. | |
| 4,555,489 A | 11/1985 | Schmitt | |
| 4,690,689 A | 9/1987 | Malcosky et al. | |
| 4,722,394 A | 2/1988 | Wellington et al. | |
| 4,725,551 A | 2/1988 | Thompson | |
| 4,742,873 A | 5/1988 | Craig, III | |
| 4,783,314 A | 11/1988 | Hoots et al. | |
| 4,826,689 A | 5/1989 | Violanto | |
| 4,960,884 A * | 10/1990 | Roush | A01N 31/04 514/717 |
| 5,114,676 A | 5/1992 | Leiner et al. | |
| 5,128,358 A * | 7/1992 | Saccomano | C07C 217/60 514/392 |
| 5,212,093 A | 5/1993 | Richardson et al. | |
| 5,246,860 A | 9/1993 | Hutchins | |
| 5,649,596 A | 7/1997 | Jones et al. | |
| 5,798,319 A | 8/1998 | Schlosberg | |
| 5,905,036 A | 5/1999 | Pope et al. | |
| 6,003,365 A | 12/1999 | Pope | |
| 6,192,985 B1 | 2/2001 | Hinkel et al. | |
| 6,321,595 B1 | 11/2001 | Pope | |
| 6,326,398 B1 * | 12/2001 | Chiang | C07C 235/74 514/535 |
| 6,331,436 B1 | 12/2001 | Richardson et al. | |
| 6,645,769 B2 | 11/2003 | Tayebi et al. | |
| 6,659,175 B2 | 12/2003 | Malone et al. | |
| 6,725,926 B2 | 4/2004 | Nguyen et al. | |
| 7,032,622 B2 | 4/2006 | Kitamura et al. | |
| 7,032,662 B2 | 4/2006 | Malone | |
| 7,347,260 B2 | 3/2008 | Ferguson | |
| 7,410,011 B2 | 8/2008 | Anderson | |
| 7,472,748 B2 | 1/2009 | Gdanski et al. | |
| 7,491,682 B2 | 2/2009 | Gupta et al. | |
| 7,493,955 B2 | 2/2009 | Gupta et al. | |
| 8,393,395 B2 | 3/2013 | Cochet et al. | |
| 8,445,480 B2 * | 5/2013 | Hunt | C07D 413/10 514/211.15 |

(Continued)

FOREIGN PATENT DOCUMENTS

| | | |
|---|---|---|
| DE | 4424712 | 1/1996 |
| EP | 0282232 | 9/1988 |
| JP | 04-139299 | 5/1992 |
| WO | 2005090490 | 9/2005 |

OTHER PUBLICATIONS

Washkuhn, R. J. et al, Journal of Pharmaceutical Sciences 1970, 59, 779-781.*
Katritzky, A. R. et al, Energy & Fuels 1990, 4, 499-505.*
Steinberg, S. M. et al, Water Research 1995, 29, 965-969.*
Rovani, J. F. et al, Report WRI-09-R002 "Enhanced Oil Recovery: Aqueous Flow Tracer Measurement" 2009, 25 pages.*
Spectrum Tracer Services LLC Home webpage, 4 pages, downloaded Nov. 21, 2016 from http://www.spectrumtracer.com/.*

(Continued)

*Primary Examiner* — Arlen Soderquist
(74) *Attorney, Agent, or Firm* — Marshall, Gerstein & Borun LLP

(57) ABSTRACT

A method of hydraulic fracturing, and tracer composites for use in the fracturing procedure, for tracing the production of formation water from one or more fractured zones. The tracer composites preferably include a formation water tracer material adsorbed onto a solid carrier material.

19 Claims, No Drawings

(56) References Cited

U.S. PATENT DOCUMENTS

| | | | |
|---|---|---|---|
| 8,640,773 B2 | 2/2014 | Hewitt et al. | |
| 9,594,070 B2* | 3/2017 | Rule | G01N 33/241 |
| 2002/0049191 A1* | 4/2002 | Springer | C07D 501/00 514/203 |
| 2003/0006036 A1 | 1/2003 | Malone | |
| 2004/0094297 A1 | 5/2004 | Malone | |
| 2004/0110302 A1 | 6/2004 | Vamvakaris | |
| 2004/0142922 A1* | 7/2004 | Alanine | C07D 317/46 514/217.03 |
| 2004/0192728 A1* | 9/2004 | Codd | C07D 215/38 514/313 |
| 2006/0052251 A1 | 3/2006 | Anderson | |
| 2006/0124301 A1 | 6/2006 | Gupta et al. | |
| 2006/0144588 A1 | 7/2006 | Ferguson | |
| 2006/0165622 A1* | 7/2006 | Hiramoto | A61K 8/347 424/65 |
| 2007/0148356 A1 | 6/2007 | Russell | |
| 2007/0215385 A1 | 9/2007 | Anderson | |
| 2008/0011776 A1 | 1/2008 | Patel et al. | |
| 2010/0307744 A1 | 12/2010 | Cochet et al. | |
| 2010/0307745 A1 | 12/2010 | Lafitte et al. | |
| 2011/0220360 A1 | 9/2011 | Lindvig et al. | |
| 2011/0257887 A1 | 10/2011 | Cooper et al. | |
| 2011/0260051 A1 | 10/2011 | Preudhomme | |
| 2011/0277996 A1 | 11/2011 | Cullick | |
| 2012/0289716 A1 | 5/2012 | Suzuki et al. | |
| 2013/0031971 A1 | 2/2013 | Freese et al. | |
| 2013/0084643 A1 | 4/2013 | Commarieu | |
| 2014/0294675 A1 | 10/2014 | Melker | |
| 2015/0005315 A1* | 1/2015 | Carroll | C07D 295/13 514/253.12 |
| 2015/0110722 A1 | 4/2015 | Hohn | |
| 2015/0323515 A1 | 11/2015 | Rule et al. | |

OTHER PUBLICATIONS

Anthony Crasto Reagents webpage on the Jonesd Reagent, 4 pages, downloaded Nov. 21, 2016 from https://sites.google.com/site/anthonycrastoreagents/jones-reagent.*

EOG Resources Inc amemded Hydraulic Fracturing Fluid Disclosure, submitted Feb. 2, 2015, downloaded Sep. 19, 2017 from http://ocdimage.emnrd.state.nm.us/Imaging/FileStore/santafe/wf/20150202/30025420860000_02_02_2015_08_44_31.pdf.*

EOG Resources Inc amemded Hydraulic Fracturing Fluid Disclosure, submitted Mar. 11, 2015, downloaded Sep. 19, 2017 from http://ocdimage.emnrd.state.nm.us/imaging/filestore/SantaFe/WF/20150311/30025420860000_03_11_2015_09_33_16.pdf.*

PCT/US2017/028075; International Search Report and Written Opinion; dated Jun. 8, 2017; Applicant: Spectrum Tracer Services, LLC; Published in: WO.

PCT/US2014/063707; International Search Report and Written Opinion; Feb. 12, 2015; Applicant: Spectrum Tracer Services, LLC; Published in: WO.

National Institute of Standards and Technology. Methyl 4-Flourobenzoate; Material Measurement Laboratory; Jan. 2, 2011; Internet: www.webbook.nist.gov/cgi/cbook.cgi?ID+403-33-8 &Units=SI.

Gilley et al., Adsorption of Bromide Tracers Onto Sediment, Biological Systems Engineering; Jan. 1, 1990.

Greenkorn, Experimental Study of Waterflood Tracers, Journal of Petroleum Technology, Jan. 1962, pp. 87-92.

Bowman, Evaluation of Some New Tracers for Soils Water Studies, Soil Science Soc. Am. J. vol. 48, 1984, pp. 987-993.

SPE 31094, Pope et al., Field Study of Guar Removal From Hydraulic Fractures, Society of Petroleum Engineers, 1996.

SPE 35233, McLaughlin et al., Radioactive Tracers: Review of Principle Factors in Design and Application, Society of Petroleum Engineers, 1996.

SPE 39920, Willberg et al., Optimization of Fracture Cleanup Using Flowback Analysis, Petroleum Engineers, 1998.

SPE 56427, Dugstad et al., Application of Tracers to Monitor Fluid Flow in the Snorre Field: A Field Study, Society of Petroleum Engineers, 1999.

Davis et al., An Introduction to Ground-Water Tracers, National Technical Information Service, Mar. 1985.

Bowman, R.S. et al., Ground Water 1992, 30, 8-14.

Serres-Piole, C. et al., Journal of Chromatography A 2011, 1218, 5872-5877 (Abstract Only).

* cited by examiner

METHOD AND COMPOSITIONS FOR HYDRAULIC FRACTURING AND FOR TRACING FORMATION WATER

FIELD OF THE INVENTION

The present invention relates to methods of hydraulic fracturing and to tracer composites which can be used in conjunction with hydraulic fracturing procedures to trace the production of formation water from individual or multiple fractured zones.

BACKGROUND OF THE INVENTION

When conducting a hydraulic fracturing operation, a hydraulic fracturing fluid is pumped into a subterranean formation under sufficient pressure to create, expand, and/or extend fractures in the formation and to thus provide enhanced recovery of the formation fluid. Hydraulic fracturing fluids typically comprise water and sand, or other proppant materials, and also commonly include various types of chemical additives. Examples of such additives include: gelling agents which assist in suspending the proppant material; crosslinkers which help to maintain fluid viscosity at increased temperatures; gel breakers which operate to break the gel suspension after the fracture is formed and the proppant is in place; friction reducers; clay inhibitors; corrosion inhibitors; scale inhibitors; acids; surfactants; antimicrobial agents; and others.

Fracturing operations have long been conducted in both low permeability and high permeability formations in order, for example, to increase the rate of production of hydrocarbon products or to increase the injection rates of water or gas injection wells. Moreover, with the introduction of slickwater fracturing procedures which use large quantities of water containing friction reducers, it is now also possible to stimulate naturally fractured shales by fracturing multiple intervals during staged treatments in horizontal wellbores. Treatment of all zones of interest in a horizontal well may require several hours to a few days to complete.

Water soluble chemical tracers have been used heretofore in hydraulic fracturing operations to trace the return of the aqueous fracturing fluid. These water soluble tracers are intended to dissolve in and flow with the aqueous fracturing fluid.

In a multistage hydraulic fracturing operation, a different chemical tracer can be added to the fracturing fluid used in each of the individual stages. After all of the fracturing stages have been completed, the fluid produced from the well is sampled and analyzed for the presence of the tracers, preferably on a periodic or continuous basis. The detection of one or more of the chemical tracers in the production fluid indicates which of the stages are flowing (i.e., the stages from which the fracturing fluids are returning).

Unfortunately, however, this procedure does not provide significant information as to which of the stages, if any, are producing formation water. Formation water is naturally occurring water which is commonly present in oil and/or gas formations. Formation water salinity levels typically range from 5 to 300 parts part thousand.

The ability to detect and evaluate the production of formation water from the individual stages of a multistage well would be greatly beneficial. Information obtained from such a method could be used to allocate the formation water produced to individual stages. Information from this procedure would also allow an operator to know if certain frac stages have contacted "wet" zones outside the intended target. The operator would then know which interval or frac needs to be shut off to prevent higher than normal formation water production. Tracer data could also help delineate between stage differences in water/oil ratios.

Consequently, a need exists for a procedure capable of (a) distinguishing formation water production from the return of the aqueous fracturing fluid, (b) detecting and determining the flow of formation water from each fracturing stage, and (c) determining the rate of formation water production from each stage or at least the comparative rates of formation water production from multiple fractured zones, particularly in horizontal wells.

SUMMARY OF THE INVENTION

The present invention satisfies the needs and alleviates the problems discussed above.

In one aspect, there is provided a tracer composite for use in tracing the production of formation water. The tracer composite preferably comprises: (a) a solid carrier material which is substantially non-soluble in water and (b) a tracer carried on the carrier material, wherein the tracer preferably is or is formed from a halogenated benzoic aldehyde or a halogenated benzoic acid.

In another aspect, there is provided a tracer composite for use in tracing the production of formation water wherein the composite preferably comprises: (a) a solid carrier material which is substantially non-soluble in water and (b) a tracer carried on the carrier material, wherein the tracer is not substantially eluted from the carrier in water having a salinity level of less than 1 part per thousand by weight but is eluted from the carrier at a rate which increases as the water salinity level increases.

In another aspect, there is provided a method of producing a tracer composite for use in tracing the production of formation water, the method preferably comprising the step of adsorbing a halogenated benzoic aldehyde on a solid carrier material which provides catalytic sites in the presence of water which convert at least a portion of the halogenated benzoic aldehyde adsorbed on the solid carrier material to a halogenated benzoic acid.

In another aspect, there is provided a method of fracturing a subterranean formation, the method preferably comprising the steps of: (a) injecting a fracturing fluid into a fracturing zone of the subterranean formation wherein: at least a portion of the fracturing fluid includes an amount of a tracer composite material, the tracer composite material comprises a tracer on a solid carrier material, the tracer is for tracing the formation water, the carrier material is substantially non-soluble in water, the tracer is or is formed from a halogenated benzoic aldehyde or a halogenated benzoic acid, and the tracer is not substantially eluted from the solid carrier material in water having a salinity level (e.g., a sodium chloride content) of less than 1 part per thousand by weight but is eluted from the carrier at a rate which increases as the water salinity level increases, and (b) analyzing a product recovered from a well associated with the subterranean formation for the presence of the tracer to determine whether the product includes formation water produced from the fracturing zone.

In another aspect of the fracturing method just described, the fracturing zone which is fractured in step (a) is a first fracturing zone and the method preferably further comprises the steps of: (c) injecting, prior to step (b), a fracturing fluid into a second fracturing zone of the subterranean formation wherein: at least a portion of the fracturing fluid injected into the second fracturing zone includes an amount of a second tracer composite material, the second tracer composite material comprises a second tracer on a solid carrier material, the second tracer is for tracing formation water, the carrier material of the second tracer composite material is substantially non-soluble in water, the second tracer is different from said first tracer, the second tracer is or is formed from a halogenated benzoic aldehyde or a halogenated benzoic acid adsorbed on the solid carrier material of the second tracer composite, and the second tracer is preferably not substantially eluted from the solid carrier material in water having a salinity level of less than 1 part per thousand by weight but is eluted from the carrier at a rate which increases as the water salinity level increases and (d) analyzing the product recovered from the well for the presence of the second tracer to determine whether the product includes formation water produced from the second fracturing zone.

Further aspects, features, and advantages of the present invention will be apparent to those of ordinary skill in the art upon reading the following Detailed Description of the Preferred Embodiments.

DETAILED DESCRIPTION OF THE PREFERRED EMBODIMENTS

The present invention provides (1) a method of hydraulic fracturing, (2) tracer composites which can be used in various types of downhole operations for tracing formation water and are particularly well suited for use in the inventive fracturing method, and (3) a method for forming the inventive tracer composites.

The inventive fracturing method and tracer composites can be used in single stage or multistage fracturing operations and are particularly well suited for use in multistage hydraulic fracturing operations such as those conducted in horizontal wells. Using the inventive hydraulic fracturing method and tracer composites, the well operator can determine: (a) whether formation water is being produced from any given fractured zone; (b) how much, or the rate at which, formation water is being produced from the fractured zone; and (c) the comparative formation water production from any given fractured zone versus the other fractured zones in the well.

The inventive tracer composite comprises: (1) a solid carrier material which is preferably non-soluble or substantially non-soluble in water and (2) a tracer which is preferably adsorbed on the solid carrier material. The tracer preferably is not substantially eluted from the solid carrier material in water having a salinity level of less than 1 part per thousand by weight but is eluted from the carrier at a rate which is preferably proportional or substantially proportional to the water salinity level as the salinity level increases.

The initial release of the tracer while being pumped into the fracture can also be further reduced or eliminated by coating the tracer composite with a hydrophobic material. This coating can be a grease or wax. The coating can be applied by heating the coating material to a liquid and spraying onto the tracer/carrier composite as the composite tumbles or in the case where the coating is a solid wax like a paraffin the composite can simply be tumbled with coating material. The coating amount would be preferably 5 to 40% by weight of the resulting coated composite, more preferably about 10%.

It is also preferred that the chemical tracers used in the inventive composite not be substantially soluble in crude oil at 25° C. and 100 kPa.

In addition to the above, the tracer used in forming the inventive composite will also preferably be: (a) chemically stable under the temperature, pressure and other physical conditions to which the tracer will be exposed within the subterranean formation; (b) substantially chemically inert with respect to the other components of the fracturing fluid and to the liquids, solids, and gases within the formation; and (c) analytically detectable at low concentration levels (most preferably in parts per billion).

Examples of tracers preferred for use in the inventive composite include, but are not limited to, halogenated benzoic aldehydes and halogenated benzoic acids. The tracer material used in the inventive composite will most preferably be or be formed from a halogenated benzoic aldehyde. Halogenated benzoic aldehydes suitable for use in the inventive composite include, but are not limited to:
2-fluorobenzaldehyde; 4-fluorobenzaldehyde; 2, 3, 4, 5-tetrafluorobenzaldehyde; 2-(trifluoromethyl) benzaldehyde; 4-(trifluoromethyl) benzaldehyde; 2,5-difluorobenzaldehyde; 3-fluorobenzaldehyde; 2, 6-difluorobenzaldehyde; pentafluorobenzaldehyde; 3, 5-difluorobenzaldehyde; 2,4-difluorobenzaldehyde; 3,4-difluorobenzaldehyde; 3,4,5-trifluorobenzaldehyde; 2,3,4-trifluorobenaldehyde; 2,4,5-trifluorobenzaldehyde; 2,3-difluorobenzaldehyde; 3-(trifluoromethyl) benzaldehyde; 2-chlorobenzaldehyde; 4-chlorobenzaldehyde; 3-chlorobenzaldehyde; 2,5-dichlorobenzaldehyde; 3,5-dichlorobenzaldehyde; 2,6-dichlorobenzaldehyde; 3,4-dichlorobenzaldehyde; 2,4-dichlorobenzaldehyde; 2-chloro-4-fluorobenzaldehyde; 5-chloro-2-fluorobenzaldehyde; 4-chloro-3-fluorobenzaldehyde; 3-chloro-4-fluorobenzaldehyde; 4-chloro-2-fluorobenzaldehyde; 5-bromo-2-chlorobenzaldehyde; 2-bromo-5-chlorobenzaldehyde; 2-bromo-4-fluorobenzaldehyde; 3-bromo-4-fluorobenzaldehyde; 2-bromo-5-fluorobenzaldehyde; 4-bromo-2-fluorobenzaldehyde; 4-bromo-3-fluorobenzaldehyde; 3-bromo-2-fluorobenzaldehyde; 3-bromo-2,5-difluorobenzaldehyde; or 2-bromo-4, 5-difluorobenzaldehyde.

Examples of halogenated benzoic acids suitable for use in the inventive composite include, but are not limited to, the halogenated benzoic acids corresponding to the above-listed halogenated benzoic aldehydes.

The use of a tracer compound which is non-soluble or substantially non-soluble in the aqueous fracturing fluid assists in preventing the tracer compound from being prematurely leached out of the fractured zone due to the interaction of the tracer composite with the aqueous fracturing fluid when the fracturing fluid return flows back to the wellbore. The leaching out of the tracer compound can result in the loss of the tracer material and can also produce false positive readings for the fractured zone.

As noted above, the solid carrier material used in forming the inventive tracer composite will preferably be non-soluble or substantially non-soluble in water.

In addition, all or substantially all (i.e., at least 95% by weight) of the solid carrier material will preferably be within a particle size range of from 5 to 200 mesh. The particle size of all or substantially all of the solid carrier material will more preferably be within a particle size range of from 5 to 50 mesh and will most preferably be from 8 to 24 mesh. The particle size of the solid carrier material will also preferably be approximately the same as the particle size of the proppant material used in the fracturing fluid.

In addition, the carrier material will preferably have a pore size in the range of from about 20 to about 400 Å (more preferably from about 60 to about 300 Å), a micro porosity of from about 50 to about 200 $m^2$ per gram (more preferably about 100 m² per gram), and a specific gravity which is preferably not less than and is more preferably slightly greater than water. The density of the solid carrier material will preferably be in the range of from 1.1 to 3 grams/ml and will more preferably be in the range of from 1.2 to 2 grams/ml. Further, the porous carrier particles will preferably be capable of adsorbing an amount of the tracer of up to 50% by weight of the carrier material and will more preferably be capable of adsorbing an amount of the tracer material in the range of from about 5% to about 30% by weight of the total weight of the inventive tracer composite.

The carrier material will also preferably be a material which will adsorb halogenated benzoic aldehydes of the type described above without the use of a solvent and will provide catalytic sites in the presence of water for converting at least a portion of (preferably at least 50% and more preferably at least 99%) or all of the adsorbed halogenated benzoic aldehyde material to a corresponding benzoic acid. The oxidation of the aldehydes materials to their corresponding benzoic acid forms prevents the tracer material from leaching out of the solid carrier material to any significant degree except when exposed to the increased salinity of the formation water.

The catalyzed oxidation of the adsorbed halogenated benzoic aldehyde material in the presence of water can be illustrated as follows:

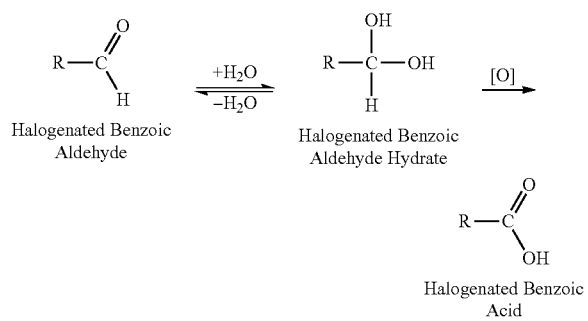

Examples of solid carrier materials preferred for use in the tracer composite include, but are not limited to, diatomaceous earth, silica gel, alumina, calcined clay, porous ceramics, and granular carbon. The carrier material will preferably be a granular activated charcoal. Prior to adding the tracer material thereto, the activation of the charcoal will preferably be carried out by heating the charcoal (e.g., at about 150° C. for about 12 hours, preferably under vacuum) to desorb water therefrom. Other carrier materials used in the inventive composite will also preferably be activated in a similar manner prior to the adsorption of the tracer material.

Further, when using silica gel or a porous ceramic as the carrier material, the material will also preferably be silanized by contacting with a silanizing agent such as hexamethyldisilazane, chlorotrimethylsilane, or poly-(dimethylsiloxane) in order to deactivate hydrophilic groups on the surfaces of the porous material. The silanizing agent will preferably be applied in the form of a solvent solution (e.g., an acetonitrile or hexane solution) and the treated carrier material will preferably be drained and dried prior to applying the tracer thereto.

The activation, silanizing, and/or other pre-treatment of the carrier material to cause the carrier material to be more hydrophobic further prevents the tracer material from being prematurely leached out of the fractured zone due to interaction with the aqueous fracturing fluid.

When the tracer material used in the inventive composite is a halogenated benzoic aldehyde of the type described above, the halogenated benzoic aldehyde will typically be a liquid at room temperature and can be adsorbed on the particulate carrier material without the use of a solvent. The halogenated benzoic aldehyde will preferably be sprayed onto the solid carrier material while the particulate carrier material is tumbled, most preferably under vacuum conditions.

When the tracer material used in the inventive composite is or is formed from a halogenated benzoic acid, the tracer material is preferable adsorbed onto the carrier by combining the tracer with a solvent and adding the solution to the carrier, preferably under vacuum conditions and at an elevated temperature (e.g., in a vacuum dryer) in order to evaporate the solvent and leave the tracer material on the external surfaces and the internal pore surfaces of the carrier material. Examples of suitable solvents include, but are not limited to, methanol, hexane, dichloromethane, isopropyl alcohol, and acetone. Preferred application and drying conditions will typically be about 300 millibar and 50° C.

The amount of tracer compound adsorbed onto the solid carrier material will preferably be from about 5% to about 40% by weight of the total weight of the inventive composite. The amount of adsorbed tracer compound will more preferably be from about 10% to about 30% and will most preferably be from about 10% to about 20% by weight of the total weight of the inventive composite.

Although the inventive tracer composite has thus far been described as having only one tracer compound adsorbed onto the solid carrier material, it will be understood that two or more tracer compounds can alternatively be simultaneously or sequentially adsorbed onto the carrier of the inventive composite using the inventive method.

In accordance with the inventive method for fracturing a subterranean formation, an aqueous hydraulic fracturing fluid is injected into a formation zone under pressure. The hydraulic fracturing fluid will typically include a proppant material (i.e., a solid material which is different from the tracer composite provided by the present invention) and can generally also include any number of other fracturing fluid components of the type described above or otherwise used in the art. In addition, in the inventive method, an amount of an inventive tracer composite is also added to all or a portion of the injected fracturing fluid so that the inventive tracer composite is placed and remains in the formation fracture along with the proppant material.

The inventive tracer composite can be added to the fracturing fluid in the blender tub used for forming the proppant slurry. Alternatively, the tracer composite can be combined with water and a sufficient amount of a thickener (e.g., from about 9 to about 10 parts by weight xanthan gum per hundred parts by weight of water) to form an aqueous slurry of the tracer composite which can be injected into the fracturing fluid, preferably via a venturi, as the fracturing fluid is being pumped into the well.

In order to optimize the placement and use of the tracer composite material in the fracture, the tracer composite will preferably be added to and blended with the fracturing fluid so that most of the tracer composite material is placed in the fracture close to the well bore. This is preferably accomplished by blending the tracer composite material with not more than the last ⅔, more preferably not more than the last ½ and most preferably not more than the last ¼, of the proppant material delivered into the fracture.

In addition, the amount of the inventive tracer composite material added to the fracturing fluid will preferably be in the range of from about 0.1 to about 5 kilograms, more preferably from about 1 to about 4 kilograms, per fractured zone (i.e., per fracturing stage).

In a horizontal or other well having multiple fracturing stages, the inventive fracturing procedure described above using the inventive tracer composite can be performed in one, a plurality, or all of the multiple fracturing zones. However, the inventive tracer composites added to the fracturing fluids used to fracture the different formation zones will include different tracers of the type describe above so that (a) the presence of one or more tracers in the product produced from the well will indicate the particular fractured zone or zones from which formation water product was produced and (b) the concentrations of the tracers in the recovered product can be used to determine the amount of formation water being produced from any given zone, or the comparative production of formation water from one zone versus the others.

Because the tracer materials used in the inventive composites are soluble in the higher salinity formation water but are not substantially soluble in the aqueous fracturing fluid, the inventive tracing procedure is effective even during the initial flow back stage of production from the well when the injected fracturing material is or should be flowing back to the well bore. During the flow back stage, the presence of one or more tracers in the recovered fluid indicates which, if any, of the fracturing stages are producing formation water and the quantity or relative rate or amount of formation water which is being produced from each stage versus the other fracturing stages of the formation.

Moreover, at the same time, additional information can be obtained regarding the total amount of water and/or the percentage of fracturing fluid water return versus formation water production for any or each of the fracturing stages by adding an additional tracer to the fracturing fluid which will return with the fracturing fluid flow back or will follow both the fracturing fluid return and production of formation water production from the fracturing stage.

In each embodiment of the inventive fracturing method, the product stream from the well can be sampled as frequently as desired, or continuously analyzed, to determine the presence of any of the tracers from the various fractured zones in the product fluid. By way of example, but not by way of limitation, the presence and concentration of the above described tracer materials in the product sample can be determined using a gas or liquid chromatograph with a mass spectrographic detector, or using other standard laboratory techniques.

It will also be understood that, although the well from which the production samples are taken for tracer analysis will typically be the same well through which the hydraulic fracturing fluids were delivered into the formation, samples for tracer analysis can in addition or alternatively be taken from one or more other wells which are also associated with the fractured formation.

The following example is meant to illustrate, but in no way limit, the claimed invention.

EXAMPLE

A field test involving a single fracturing stage was conducted wherein 2 kg of an inventive tracer composite for tracing the recovery of formation water was added to the concluding half of the fracturing fluid injected into the formation. The inventive tracer composite used in this test was formed of benzoic aldehyde on a granular activated charcoal support. The amount of benzoic aldehyde adsorbed on the activated charcoal support was 20% by weight of the total weight of inventive tracer composite.

In addition, 1 kg of an FFI fracturing fluid tracer available from Spectrum Tracer Services was also added to the fracturing fluid during injection using a peristaltic pump.

After fracturing, samples of the fluid produced from the well were taken over a two month period and were analyzed for the presence and concentration of the formation water tracer, the FFI tracer, and salt.

The sample progression showed a gradual increase in the salinity of the recovered fluid over the sample period, thus indicating an increase in the production of formation water. This increase in salinity was accompanied by a corresponding increase in the concentration of the formation water tracer and a decrease in the concentration of the FFI fracturing fluid tracer in the recovered fluid, which indicated that the formation water tracer was being released and recovered at a greater rate and concentration in correspondence with the increased salinity of the recovered fluid and the increase production of formation water from the formation.

Thus, the present invention is well adapted to carry out the objectives and attain the ends and advantages mentioned above as well as those inherent therein. While presently preferred embodiments have been described for purposes of this disclosure, numerous changes and modifications will be apparent to those in the art. Such changes and modifications are encompassed within this invention as defined by the claims.

What is claimed:

1. A tracer composite for use in tracing production of formation water comprising:
   a solid carrier material which is substantially non-soluble in water, said solid carrier material being an activated or silanized carrier material, and
   an exposed tracer on said solid carrier material,
   wherein the tracer composite has no coating thereon over the exposed tracer and
   said exposed tracer is held on the solid carrier material by an adsorption bond which (i) substantially prevents the exposed tracer from being eluted from said solid carrier material at a detectable level in water having a salinity level of less than 1 part per thousand by weight but (ii) permits the exposed tracer, at least when said salinity level of said water reaches a value of 5 parts per thousand by weight, to be eluted from said solid carrier material at detectable levels which increase as said salinity level of said water increases.

2. The tracer composite of claim 1 wherein said exposed tracer is, or has been formed from, a halogenated benzoic aldehyde or a halogenated benzoic acid.

3. The tracer composite of claim 2 wherein said exposed tracer is, or has been formed from, a halogenated benzoic aldehyde and wherein said halogenated benzoic aldehyde is: 2-fluorobenzaldehyde; 4-fluorobenzaldehyde; 2,3,4,5-tetrafluorobenzaldehyde; 2-(trifluoromethyl) benzaldehyde; 4-(trifluoromethyl) benzaldehyde; 2,5-difluorobenzaldehyde; 3-fluorobenzaldehyde; 2,6-difluorobenzaldehyde; pentafluorobenzaldehyde; 3,5-difluorobenzaldehyde; 2,4-difluorobenzaldehyde; 3,4-difluorobenzaldehyde; 3,4,5-trifluorobenzaldehyde; 2,3,4-trifluorobenaldehyde; 2,4,5-trifluorobenzaldehyde; 2,3-difluorobenzaldehyde; 3-(trifluoromethyl) benzaldehyde; 2-chlorobenzaldehyde; 4-chlorobenzaldehyde; 3-chlorobenzaldehyde; 2,5-dichlorobenzaldehyde; 3,5-dichlorobenzaldehyde; 2,6-dichlorobenzaldehyde; 3,4-dichlorobenzaldehyde; 2,4-dichlorobenzaldehyde; 2-chloro-4-fluorobenzaldehyde; 5-chloro-2-fluorobenzaldehyde; 4-chloro-3-fluorobenzaldehyde; 3-chloro-4-fluorobenzaldehyde; 4-chloro-2-fluorobenzaldehyde; 5-bromo-2-chlorobenzaldehyde; 2-bromo-5-chlorobenzaldehyde; 2-bromo-4-fluorobenzaldehyde; 3-bromo-4-fluorobenzaldehyde; 2-bromo-5-fluorobenzaldehyde; 4-bromo-2-fluorobenzaldehyde; 4-bromo-3-fluorobenzaldehyde; 3-bromo-2-fluorobenzaldehyde; 3-bromo-2,5-difluorobenzaldehyde; or 2-bromo-4,5-difluorobenzaldehyde.

4. The tracer composite of claim 3 wherein said solid carrier material provides catalytic sites in the presence of water which convert at least 50% of said halogenated benzoic aldehyde adsorbed on said solid carrier material to a halogenated benzoic acid.

5. The tracer composite of claim 2 wherein said solid carrier material is a granular activated charcoal.

6. A method of producing a tracer composite for use in tracing formation water, said method comprising the step of adsorbing a halogenated benzoic aldehyde on a solid carrier material which provides catalytic sites in the presence of water which convert at least a portion of said halogenated benzoic aldehyde adsorbed on said solid carrier material to a halogenated benzoic acid.

7. The method of claim 6 wherein said halogenated benzoic aldehyde is adsorbed on said solid carrier material in an amount in a range of from about 5% to about 30% by weight of a total weight of said tracer composite.

8. The method of claim 7 wherein at least 50% of said halogenated benzoic aldehyde adsorbed on said solid carrier material is converted in the presence of water to said halogenated benzoic acid.

9. The method of claim 8 wherein said halogenated benzoic aldehyde is:
2-fluorobenzaldehyde; 4-fluorobenzaldehyde; 2,3,4,5-tetrafluorobenzaldehyde; 2-(trifluoromethyl) benzaldehyde; 4-(trifluoromethyl) benzaldehyde; 2,5-difluorobenzaldehyde; 3-fluorobenzaldehyde; 2,6-difluorobenzaldehyde; pentafluorobenzaldehyde; 3,5-difluorobenzaldehyde; 2,4-difluorobenzaldehyde; 3,4-difluorobenzaldehyde; 3,4,5-trifluorobenzaldehyde; 2,3,4-trifluorobenaldehyde; 2,4,5-trifluorobenzaldehyde; 2,3-difluorobenzaldehyde; 3-(trifluoromethyl) benzaldehyde; 2-chlorobenzaldehyde; 4-chlorobenzaldehyde; 3-chlorobenzaldehyde; 2,5-dichlorobenzaldehyde; 3,5-dichlorobenzaldehyde; 2,6-dichlorobenzaldehyde; 3,4-dichlorobenzaldehyde; 2,4-dichlorobenzaldehyde; 2-chloro-4-fluorobenzaldehyde; 5-chloro-2-fluorobenzaldehyde; 4-chloro-3-fluorobenzaldehyde; 3-chloro-4-fluorobenzaldehyde; 4-chloro-2-fluorobenzaldehyde; 5-bromo-2-chlorobenzaldehyde; 2-bromo-5-chlorobenzaldehyde; 2-bromo-4-fluorobenzaldehyde; 3-bromo-4-fluorobenzaldehyde; 2-bromo-5-fluorobenzaldehyde; 4-bromo-2-fluorobenzaldehyde; 4-bromo-3-fluorobenzaldehyde; 3-bromo-2-fluorobenzaldehyde; 3-bromo-2,5-difluorobenzaldehyde; or 2-bromo-4,5-difluorobenzaldehyde.

10. The method of claim 9 wherein said solid carrier material is a granular activated charcoal.

11. A method of fracturing and tracing production of formation water from a subterranean formation, said method comprising the steps of:
(a) injecting a fracturing fluid into a fracturing zone of a subterranean formation wherein: at least a portion of said fracturing fluid includes an amount of a tracer composite material, said tracer composite material comprises an exposed tracer on a solid carrier material wherein said exposed tracer is for tracing said formation water, said solid carrier material is substantially non-soluble in water, said solid carrier material is an activated or silanized carrier material, the tracer composite material has no coating thereon over the exposed tracer, said exposed tracer is or is formed from a halogenated benzoic aldehyde or a halogenated benzoic acid, and said exposed tracer is held on the solid carrier material by an adsorption bond which (i) substantially prevents the exposed tracer from being eluted from said solid carrier material at a detectable level in water having a salinity level of less than 1 part per thousand by weight but (ii) permits the exposed tracer, at least when said salinity level of said water reaches a value of 5 parts per thousand by weight, to be eluted from said solid carrier material at detectable levels which increase as said salinity level of said water increases, and
(b) analyzing a product recovered from a well associated with said subterranean formation for a presence of said exposed tracer to determine whether said product includes formation water produced from said fracturing zone.

12. The method of claim 11 wherein said tracer composite material is formed by adsorbing a halogenated benzoic aldehyde on said solid carrier material and wherein said solid carrier material provides catalytic sites in the presence of water which convert at least a portion of said halogenated benzoic aldehyde adsorbed on said solid carrier material to a halogenated benzoic acid.

13. The method of claim 12 wherein said halogenated benzoic aldehyde is:
2-fluorobenzaldehyde; 4-fluorobenzaldehyde; 2,3,4,5-tetrafluorobenzaldehyde; 2-(trifluoromethyl) benzaldehyde; 4-(trifluoromethyl) benzaldehyde; 2,5-difluorobenzaldehyde; 3-fluorobenzaldehyde; 2,6-difluorobenzaldehyde; pentafluorobenzaldehyde; 3,5-difluorobenzaldehyde; 2,4-difluorobenzaldehyde; 3,4-difluorobenzaldehyde; 3,4,5-trifluorobenzaldehyde; 2,3,4-trifluorobenaldehyde; 2,4,5-trifluorobenzaldehyde; 2,3-difluorobenzaldehyde; 3-(trifluoromethyl) benzaldehyde; 2-chlorobenzaldehyde; 4-chlorobenzaldehyde; 3-chlorobenzaldehyde; 2,5-dichlorobenzaldehyde; 3,5-dichlorobenzaldehyde; 2,6-dichlorobenzaldehyde; 3,4-dichlorobenzaldehyde; 2,4-dichlorobenzaldehyde; 2-chloro-4-fluorobenzaldehyde; 5-chloro-2-fluorobenzaldehyde; 4-chloro-3-fluorobenzaldehyde; 3-chloro-4-fluorobenzaldehyde; 4-chloro-2-fluorobenzaldehyde; 5-bromo-2-chlorobenzaldehyde; 2-bromo-5-chlorobenzaldehyde; 2-bromo-4-fluorobenzaldehyde; 3-bromo-4-fluorobenzaldehyde; 2-bromo-5-fluorobenzaldehyde; 4-bromo-2-fluorobenzaldehyde; 4-bromo-3-fluorobenzaldehyde; 3-bromo-2-fluorobenzaldehyde; 3-bromo-2,5-difluorobenzaldehyde; or 2-bromo-4, 5-difluorobenzaldehyde.

14. The method of claim 11 wherein said solid carrier material is a granular activated charcoal.

15. The method of claim 11 wherein at least most of said fracturing fluid injected into said fracturing zone includes a proppant material and said tracer composite material is blended with not more than a final ⅔ portion of a total amount of said proppant material which is injected into said fracturing zone.

16. The method of claim 15 wherein said tracer composite material is blended with not more than a final ½ portion of said total amount of said proppant material which is injected into said fracturing zone.

17. The method of claim 15 wherein said tracer composite material is blended with not more than a final ¼ portion of said total amount of said proppant material which is injected into said fracturing zone.

18. The method of claim 11 wherein said fracturing zone is a first fracturing zone, said tracer composite material is a first tracer composite material, said exposed tracer is a first exposed tracer, and said method further comprises the steps of:
(c) injecting, prior to step (b), a fracturing fluid into a second fracturing zone in said subterranean formation wherein: at least a portion of said fracturing fluid injected into said second fracturing zone includes an amount of a second tracer composite material, said second tracer composite material comprises a second exposed tracer on a solid carrier material, said second exposed tracer is for tracing formation water, said solid carrier material of said second tracer composite material is substantially non-soluble in water, said solid carrier material is an active or silanized carrier material, the second tracer composite material has no coating thereon over the second exposed tracer, said second exposed tracer is different from said first exposed tracer, said second exposed tracer is or is formed from a halogenated benzoic aldehyde or a halogenated benzoic acid adsorbed on said solid carrier material of said second tracer composite material, and said second exposed tracer is held on the solid carrier material of the second tracer composite material by an adsorption bond which (i) substantially prevents the second exposed tracer from being eluted from said solid carrier material of said second tracer composite material at a detectable level in water having a salinity level of less than 1 part per thousand by weight but (ii) permits the second exposed tracer to be eluted from said solid carrier material of said second tracer composite material at a detectable level at least when exposed to formation water having any salinity value which is equal to or greater than 5 parts per thousand by weight, and
(d) analyzing said product recovered from said well for a presence of said second exposed tracer to determine whether said product includes formation water produced from said second fracturing zone.

19. The method of claim 11 further comprising the steps of:
adding, prior to step (b), a fracturing fluid tracer to said fracturing fluid for tracing a return of said fracturing fluid, said fracturing fluid tracer being different from said exposed tracer for tracing said formation water and
analyzing said product recovered from said well associated with said subterranean formation for a presence of said fracturing fluid tracer to determine whether said product includes a return of said fracturing fluid from said fracturing zone.

* * * * *